United States Patent [19]

Neuwirth et al.

[11] Patent Number: 5,244,525

[45] Date of Patent: Sep. 14, 1993

[54] METHODS FOR BONDING, CUTTING AND PRINTING POLYMERIC MATERIALS USING XEROGRAPHIC PRINTING OF IR ABSORBING MATERIAL

[75] Inventors: Joseph G. Neuwirth, Cumming, Ga.; Paul J. Northey, Cambridge, Mass.

[73] Assignee: Kimberly-Clark Corporation, Neenah, Wis.

[21] Appl. No.: 916,935

[22] Filed: Jul. 20, 1992

Related U.S. Application Data

[63] Continuation of Ser. No. 546,137, Jun. 29, 1990, abandoned, which is a continuation-in-part of Ser. No. 115,664, Nov. 2, 1987, abandoned.

[51] Int. Cl.$^5$ ............................................. B32B 31/00
[52] U.S. Cl. ..................... 156/251; 156/267; 156/272.2; 156/277; 156/290; 83/170
[58] Field of Search ............. 156/277, 290, 324, 272.2, 156/272.8, 251, 267; 162/157.2–157.3, 157.4, 157.5; 234/2; 83/170

[56] References Cited

U.S. PATENT DOCUMENTS

| | | | |
|---|---|---|---|
| 3,016,599 | 1/1962 | Perry, Jr. | 28/78 |
| 3,189,702 | 6/1965 | Wall et al. | 206/63.2 |
| 3,341,394 | 9/1967 | Kinney | 161/72 |
| 3,420,724 | 1/1969 | Saunders | 156/272 |
| 3,528,867 | 9/1970 | Leatherman et al. | 156/272 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 F |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,909,582 | 9/1975 | Bowen | 219/121 LM |
| 3,978,185 | 8/1976 | Buntin et al. | 264/93 |
| 4,025,378 | 5/1977 | Amsden et al. | 156/272 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,156,626 | 5/1979 | Souder | 156/272 |

(List continued on next page.)

OTHER PUBLICATIONS

V. A. Wente et al., *Tappi Journal*, 56, 74–77 (1973).
John Toon, "Run Me A Copy of That Pillow Case, Please," Georgia Tech Research Horizons, Winter, 1988, pp. 4–7.

(List continued on next page.)

*Primary Examiner*—David A. Simmons
*Assistant Examiner*—Chester T. Barry
*Attorney, Agent, or Firm*—William E. Maycock

[57] ABSTRACT

A method for bonding, cutting and printing sheets of polymeric material is provided which comprises the steps of: (a) forming first, second and third patterns of an infrared-absorbing material on one of the sheets, the first pattern corresponding to the locations at which the sheets are to be bonded together, the second pattern corresponding to the locations at which the sheets are to be cut, and the third pattern corresponding to the locations at which the sheets are to be printed; (b) contacting the sheets with one another; (c) exposing the contacted sheets to infrared energy; (d) applying pressure to the sheets; and (e) cooling the sheets. The amount of infrared energy to which the sheets are exposed and the distribution of the infrared-absorbing material are chosen so that 1) the sheets bond to one another in the areas of the first pattern, 2) the sheets are cut in the areas of the second pattern, and 3) the sheets are neither bonded nor cut in the areas of the third pattern. In certain preferred embodiments, the infrared-absorbing material is xerographic toner and the patterns are formed by a xerographic process.

14 Claims, 1 Drawing Sheet

U.S. PATENT DOCUMENTS

| | | | |
|---|---|---|---|
| 4,340,563 | 7/1982 | Appel et al. | 264/518 |
| 4,392,257 | 7/1983 | Furga | 2/105 |
| 4,405,297 | 9/1983 | Appel et al. | 425/72 S |
| 4,434,204 | 2/1984 | Hartman et al. | 428/198 |
| 4,470,861 | 9/1984 | Kravig et al. | 156/222 |
| 4,504,529 | 3/1985 | Sorensen et al. | 427/437 |
| 4,539,284 | 9/1985 | Barbetta et al. | 430/110 |
| 4,627,811 | 12/1986 | Greiser et al. | 425/72 S |
| 4,644,045 | 2/1987 | Fowells | 526/348 |
| 4,663,220 | 5/1987 | Wisneski et al. | 428/221 |
| 4,774,272 | 9/1988 | Lamphere et al. | 162/157.4 X |

OTHER PUBLICATIONS

M. H. Bruno, "Kirk-Othmer Encyclopedia of Chemical Technology," Third Edition, vol. 19, John Wiley & Sons, NY, 1982, pp. 110-163.

Gary N. Flood, "Ultrasonic Bonding: A Practical View," Insight 86 International Conferences, Washington, D.C., Section VII, pp. 1-13.

V. A. Wente, *Industrial and Engineering Chemistry*, 48, 1342-1346 (1956).

V. A. Wente et al., "Manufacture of Superfine Organic Fibers," Navy Research Laboratory Report 4364, Washington, D.C., 1954.

"Kirk-Othmer Encyclopedia of Chemical Technology," Third Edition, vol. 22, John Wiley & Sons, New York, 1982, p. 795.

"Kirk-Othmer Encyclopedia of Chemical Technology," Third Edition, vol. 24, John Wiley & Sons, New York, 1984, pp. 631-636.

"Encyclopedia of Polymer Science and Engineering," vol. 16, John Wiley & Sons, New York, 1989, pp. 704 and 705.

"Encyclopedia of Polymer Science and Engineering," vol. 10, John Wiley & Sons, New York, 1987, pp. 204 and 205.

Webster's II New Riverside University Dictionary, The Riverside Publishing Company, 1984, p. 459.

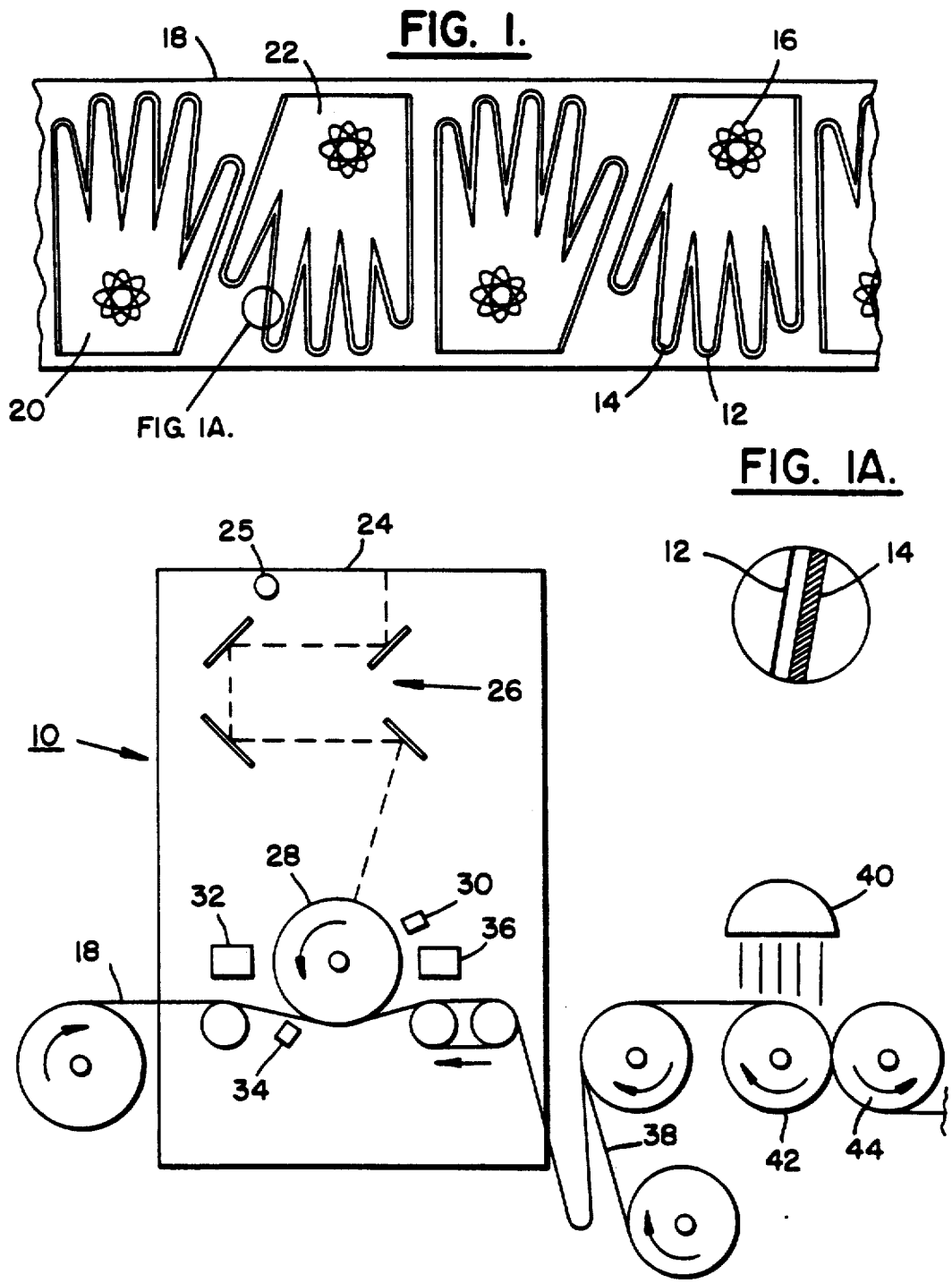

METHODS FOR BONDING, CUTTING AND PRINTING POLYMERIC MATERIALS USING XEROGRAPHIC PRINTING OF IR ABSORBING MATERIAL

This is a continuation application of application Ser. No. 07/546,137, filed on Jun. 29, 1990 now abandoned, which application is a continuation-in-part of application Ser. No. 07/115,664, filed Nov. 2, 1987, now abandoned.

BACKGROUND OF THE INVENTION

1. Field of the Invention

This invention relates to the bonding, cutting and printing of polymeric materials.

2. Background of the Invention

Sheets of polymeric materials, including films, e.g., polyethylene films, and nonwoven fabrics, e.g., spunbonded and meltblown polypropylene nonwoven webs, which materials typically are thermoplastic, have been used to make a variety of commercial products, such as diapers, feminine care products, gloves, and the like. Assembly of these products generally involves the steps of: (1) cutting specified shapes from the sheets; (2) bonding two or more sheets together along specified contours; and (3) in some cases, printing a pattern on portions of the sheets which form the outer surface of the finished product. The bonding, cutting, and printing steps can, in general, be performed in any order, e.g., pre-cut and pre-printed sheets can be bonded together or full sheets (webs) can be bonded together, printed, and then cut.

Various techniques have been used to perform the cutting, bonding, and printing operations. For example, cutting dies having prescribed contours corresponding to those of the finished article have been used to cut polymeric sheets. Bonding has been performed by applying glue to the sheets in specified patterns, as well as through the use of heated mandrels having shapes which correspond to the areas in which bonding is to occur. Bonding also can be accomplished by application of ultrasonic energy. See Flood, Gary, N. "Ultrasonic Bonding: A Practical View," Advanced Forming-/Bonding Conference, Insight 86 International Conferences, Washington, D.C., Sep. 7-9, 1986, Section VII, pages 1-13. Printing has been performed using classical printing techniques, such as lithography.

A fundamental problem with the existing techniques is the extensive, and thus expensive, set-up steps which are required for each product which is to be manufactured. Thus, cutting dies, gluing jigs, and the like have to be specifically fabricated on a product-by-product basis. In most cases, the cost of this tooling can only be supported by relatively large production runs. Also, in terms of manufacturing logistics, if a single production line is to produce multiple products, the tooling for each product must be stored between uses and the line must be shut down for an extended period of time each time the product being manufactured is to be changed. As with the tooling itself, these manufacturing problems add to the final cost of the product.

The use of radiant heat as part of the manufacturing process for nonwoven fabrics has been disclosed in U.S. Pat. No. 3,420,724. Specifically, this patent describes preparing a web of synthetic fibers having intermittent dark and light colored areas and applying radiant heat to the web to melt the fibers in the dark areas and thus bond the fibers together to form the finished fabric. The dark areas are distributed throughout the fabric and between 5 and 50% of the fabric's fibers lie in dark areas.

Additionally, U.S. Pat. No. 3,189,702 to Wall et al. relates to the making and sealing of packages. Briefly, a continuous narrow uniform cusped smooth-edged stripe pattern of strongly radiation-absorptive thermally nonadherent ink is imprinted on a surface of a first film segment. A second film segment is placed over and in pressure-contact with the imprinted surface at least along and adjacent said stripe. The stripe then is irradiated through one of the film segments at an intensity and for a time adequate to produce at said stripe a heating effect sufficient to cause the occurrence of autogenous bonding between the film segments only along narrow fusion bands contiguous to the edges of the strip and of a width permitting longitudinal separation of the film segments along the line by hand pulling without tearing of the segments. At least one of the film segments is transmissive of the radiation.

U. S. Pat. No. 4,504,529 to Sorensen et al. discloses a xerographic method for dry sensitization and electroless coating of an insulating surface and a powder for use with the method. The toning powder contains a sensitizing $Sn^{+2}$ compound. The toning powder can contain an infrared-absorbing material which aids in the adherence of the powder to the substrate. The three examples present in the reference describe the preparation of three different powders, all of which are to be fixed or adhered to the substrate by a solvent-based method.

U.S. Pat. No. 4,025,378 to Amsden et al. relates to a method for attaching a polyethylene sleeve label to a polyethylene bottle. The label has heat-absorbing areas which, when subjected to a heat source, cause the label and bottle to fuse together in such areas, thereby bonding the label to the bottle. Only smooth-surfaced substrates are involved and the label itself apparently undergoes localized melting to cause attachment to the bottle.

U.S. Pat. No. 4,156,626 to Souder relates to a method and apparatus for selectively heating discrete areas of surfaces with radiant energy. The method involves the use of focused radiant energy to heat in discrete areas a thermoplastic adhesive. The degree of heat absorption can be varied by the use of variations in the shading or darkness of a coating of printed materials. However, the energy source must provide a high degree of radiation of wavelengths in the visible range. In addition, the energy source is focused in order to vary the size of the surface area so as to vary the area heated and/or to vary the intensity of heating of the area.

U.S. Pat. No. 3,909,582 to Bowen relates to a method of forming a line of weakness in at least one but not all layers of a multilayer laminate. The method comprises effecting relative movement between a beam of radiant energy of a particular predetermined wavelength and intensity and the laminate so that the energy is selectively relatively absorbed by the at least one layer in an amount and manner that alters the structure of the layer and thereby forms a line of weakness in the laminate. The beam of radiant energy is supplied by a laser and is intended to affect fewer than all of the layers in the laminate. The absorptive materials of this reference apparently require the formation of vapors or a gas upon exposure to the radiation.

SUMMARY OF THE INVENTION

It now has been unexpectedly discovered that the bonding, cutting, and printing of sheets of polymeric material, where at least one sheet is a nonwoven web prepared predominantly from a thermoplastic polymeric material, can be accomplished readily through the use of a xerographic process. The use of xerography permits performing these operations without the need for significant investment in specialized, one-product equipment, such as cutting dies, gluing jigs, and the like. Moreover, switching from one product to another can be done dynamically with minimal interruption of the manufacturing process.

Accordingly, the present invention provides a method for bonding together at least two sheets of polymeric material at predetermined locations, at least one of said sheets being a nonwoven web prepared predominantly from a thermoplastic polymeric material, which method comprises the steps of:

(a) forming by a xerographic process a pattern of an infrared-absorbing xerographic toner on said nonwoven web, said pattern corresponding to the predetermined locations at which the sheets are to be bonded;
(b) contacting the sheets with one another;
(c) exposing the contacted sheets to infrared energy, said infrared energy causing the sheets to be heated to a higher temperature in the areas of the infrared-absorbing xerographic toner than in areas away from the infrared-absorbing xerographic toner;
(d) applying pressure to the sheets; and
(e) cooling the sheets or allowing the sheets to cool; the amount of infrared energy and the distribution of infrared-absorbing xerographic toner being chosen so that the sheets bond to one another in the areas of the infrared-absorbing xerographic toner.

The present invention further provides a method for bonding together at least two sheets of polymeric material at predetermined locations, at least one of said sheets being a nonwoven web prepared predominantly from a thermoplastic polymeric material, which method comprises the steps of:

(a) contacting the sheets with one another;
(b) forming by a xerographic process a pattern of an infrared-absorbing xerographic toner on said nonwoven web, said pattern corresponding to the predetermined locations at which the sheets are to be bonded;
(c) exposing the contacted sheets to infrared energy, said infrared energy causing the sheets to be heated to a higher temperature in the areas of the infrared-absorbing xerographic toner than in areas away from the infrared-absorbing xerographic toner;
(d) applying pressure to the sheets; and
(e) cooling the sheets or allowing the sheets to cool; the amount of infrared energy and the distribution of infrared-absorbing xerographic toner being chosen so that the sheets bond to one another in the areas of the infrared-absorbing xerographic toner.

In certain preferred embodiments, the method of the present invention includes the additional step prior to exposing step (c) of forming by a xerographic process a second pattern of an infrared-absorbing xerographic toner on said nonwoven web, the amount of infrared energy and the distribution of infrared-absorbing xerographic toner in the second pattern being chosen so that the performance of steps (c), (d), and (e) causes cutting of the sheets in the areas of the second pattern of infrared-absorbing xerographic toner.

Finally, steps (a), (b), and (c) can be performed in any order, e.g., the sheets can be contacted together prior to formation of the pattern, or the pattern can be formed first and the sheets thereafter brought together. In addition to bonding, cutting, and/or printing two sheets of polymeric material, the invention can be used with more than two sheets. In such cases, selective bonding, cutting, and/or printing of less than all of the sheets can be performed, if desired.

Given the rough, irregular surface of the nonwoven web, it was unexpected that the nonwoven web and at least one other sheet could be bonded and/or cut in accordance with the present invention. It also was unexpected, for the same reason, that the nonwoven web could be cut as provided by the present invention.

The accompanying drawings, which are incorporated in and constitute part of the specification, illustrate the preferred embodiments of the invention, and together with the description, serve to explain the principles of the invention.

BRIEF DESCRIPTION OF THE DRAWINGS

FIG. 1 schematically illustrates a sheet of polymeric material (i.e., a nonwoven web) upon which infrared-absorbing material has been deposited in cutting, bonding and printing patterns.

FIG. 1A is an expanded view of the circled portion of FIG. 1 illustrating the use of a thinner and darker line for the cutting pattern and a broader and lighter line for the bonding pattern.

FIG. 2 is a schematic diagram of a suitable arrangement of a photocopying machine, an infrared energy source, and two mating pressure rollers for use in practicing the method of invention.

DETAILED DESCRIPTION OF THE INVENTION

As discussed above, the present invention relates to improved methods for bonding, cutting and printing sheets of polymeric materials, one of which sheets being a nonwoven web, by xerographically forming a pattern of infrared-absorbing toner on the nonwoven web.

The nonwoven web is prepared predominately from a thermoplastic polymeric material. The term "predominantly" is used herein to mean only that there is a sufficient amount of thermoplastic polymeric material, i.e., thermoplastic fibers, present in the nonwoven web to permit bonding and/or cutting to take place. Thus, by way of example only, such term permits the use as the nonwoven web of a coformed web or a bonded carded web prepared from a mixture of thermoplastic fibers and fibers or particles which are not thermoplastic. Preferably, all of the sheets to be bonded in accordance with the present invention will be prepared from thermoplastic polymeric materials. In the event nonthermoplastic fibers or particles are present, they most commonly will be cellulosic or superabsorbent materials, both of which are well known to those having ordinary skill in the art.

A variety of thermoplastic polymeric materials can be used in the practice of the invention. Examples of suitable materials include polyethylene films, spunbonded and meltblown polypropylene fabrics, nonwoven polyester fabrics, nonwoven polyethylene fabrics, other thermoplastic fabrics, and the like. Preferably, rolls of these materials are used in the practice of the invention, although single sheets can also be used, if desired.

Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(epsilon-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenyleneisopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethyleneterephthalate) or poly(oxymethylene-1,4-cyclohexylenemethyleneoxyterephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as acrylonitrile-butadiene-styrene (ABS) copolymers, and the like; and the like.

As a practical matter, the preferred thermoplastic materials are polyolefins. The preferred polyolefins are those which contain only carbon and hydrogen atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. In addition, such term is meant to include blends of two or more polyolefins and random and block copolymers prepared from two or more different unsaturated monomers. Because of their commercial importance, the most preferred polyolefins are polyethylene and polypropylene.

As already noted, the sheets of polymeric materials which are bonded, cut, and/or printed in accordance with the present invention typically include films and nonwoven fabrics or webs. The type of nonwoven web is not known to be critical, provided it is made from a thermoplastic polymer. Thus, by way of illustration only, such web can be an air-laid or wet-laid web, a bonded carded web, or a web produced by meltblowing, coforming, or spunbonding.

The preferred nonwoven webs are those produced by meltblowing, coforming, and spunbonding. By way of illustration only, such processes are exemplified by the following references:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342-1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing - A One-Step Web Process for New Nonwoven Products", *Journal of the Technical Association of the Pulp and Paper Industry*, Vol. 56, No. 4, pp. 74-77 (1973):

(b) coforming references include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

The nature of the infrared-absorbing xerographic toner is not known to be critical, provided that such toner has been compounded properly for use with xerographic copying equipment. That is, a variety of infrared-absorbing xerographic toners can be used to form the cutting, bonding and printing patterns on the sheets. The same material can be used for all of the patterns, or some or all of the patterns can use different materials, having different absorbance characteristics, e.g., the cutting and bonding patterns can be formed from a higher absorbance material than the printing pattern. However, the toner is not fused after being applied in the desired pattern on the nonwoven web. As illustrated by the examples presented below, commercially available, black toner has been found to work successfully in the practice of the invention. As known in the art, such toner comprises a plastic resin which has been impregnated with carbon black. In addition to conventional toners, specially formulated toners can be prepared from one or more other infrared-absorbing materials.

Because many nonwoven webs are white or translucent, it often will be desired to use an infrared-absorbing xerographic toner which will not give a visible pattern, except upon close inspection. In such cases, the toner preferably will be white, translucent, or transparent. Since the plastic resin portion of the toner typically is white, translucent, or transparent, a white, transparent, or translucent toner can be obtained through the use of one or more infrared-absorbing materials which also are white, translucent, or transparent. Such materials include, by way of illustration only, aromatic carboxylic acids, aromatic dicarboxylic acids, aromatic ketones, aromatic aldehydes, naphthalene carboxylic acids, coumarins, quinones, and the like.

In general terms, the use of xerography requires drawing a pattern on a sheet of paper, placing the paper on the platen of a xerographic copying machine, and performing the xerographic copying process (except for toner fusion) with the nonwoven sheet being used in place of copying paper. By supplying the nonwoven sheet in roll form and operating the copying machine in a continuous mode, multiple copies of the pattern can be transferred to the nonwoven sheet.

Exposure of the toner pattern to infrared energy, e.g., by passing the polymeric sheet under a focused infrared light source, produces differential heating of the polymeric sheets in the regions of the patterns. The amount of heating which takes place is determined by the absorbency and distribution of infrared-absorbing material in the toner lines. In the case of black toners, this concentration and distribution corresponds to the darkness and thinness of the toner line. The darker and thinner the line, the greater the localized heating, and thus, softening and/or melting of the polymer occurs. Accordingly, cutting is achieved by using darker and/or thinner lines, bonding is achieved by using even lighter and/or even wider lines, and printing is achieved by using even lighter and/or even wider lines. The specific darkness/thinness or, more generally, the specific concentration and distribution of infrared-absorbing materials in the toner line for any particular application will depend on the toner, infrared light source, speed of operation, and polymeric materials employed. All of these factors can be readily determined by persons of ordinary skill in the art based on the disclosure herein.

The use of xerographic copying machine 10 to form patterns 12, 14, and 16 (see FIG. 1) on a web 18 of polymeric material is schematically illustrated in FIG. 2. Copying machine 10 includes the following conventional components: platen 24, light source 25, optics section 26, photoconductor drum 28, photoconductor charging station 30, toner application station 32, web charging station 34, and drum cleaning station 36. Unlike a standard copying machine, copying machine 10 does not include a fuser station for fusing toner to copy paper. Also, copying machine 10 is preferably operated in a continuous mode.

In operation, a drawing of a single repeat of the pattern which is to be transferred to web 18, e.g., the pattern for gloves 20 and 22 in FIG. 1, is placed on platen 24. Optics section 26 images the drawing on rotating drum 28. (Either optics section 26 or platen 24 moves during the imaging operation so that the photoconductor is sequentially exposed to successive portions of the drawing.) Drum 28 is charged by charging station 30. Light from light source 25 is reflected from the drawing and imaged onto the drum by the optics section. The image of the drawing formed on the drum by the optics section locally discharges the drum, thus creating an electrostatic image of the drawing on the drum. Toner application station 32 brings toner into contact with the drum. The toner adheres to the charged areas of the drum, thus creating a toner image of the drawing on the drum. Charging station 34 charges web 18 so that the toner image is transferred to the web as the web and drum come into contact. Cleaning station 36 removes residual toner from the drum, thus preparing the drum for next copying cycle.

FIG. 1 shows the appearance of web 18 after emerging from the copying machine 10. In this illustrative example, three patterns have been formed on the web, namely, cutting pattern 12, bonding pattern 14, which is geometrically similar to cutting pattern 12 but smaller than that pattern, and printing pattern 16. Each of these patterns comprises unfused toner. As shown in FIG. 1A, cutting pattern 12 will, in general, be darker and/or thinner than bonding pattern 14, i.e., the concentration of infrared-absorbing material will be higher in cutting pattern 12 than in bonding pattern 14 and/or the line thickness of cutting pattern 12 will be smaller than the line thickness of bonding pattern 14. In turn, printing pattern 16 will be lighter and/or more diffuse than bonding pattern 14, i.e., the concentration of infrared-absorbing material will be higher in bonding pattern 14 than in printing pattern 16 and/or the line thickness of bonding pattern 14 will be smaller than the line thickness of printing pattern 16. In this way, when the patterns are exposed to infrared energy, pattern 12 will generate enough heat to locally weaken (cut through) the polymeric sheets so that the finished articles can be separated from the web, while pattern 14 will generate enough heat to locally bond the polymeric sheets but not substantially weaken them, and pattern 16 will generate enough heat to bond the toner to the polymeric material but not bond the sheets of polymeric material to each other.

Referring again to FIG. 2, after emerging from copying machine 10, web 18 is combined with web 38 and passed under infrared energy source 40. Like web 18, web 38 is composed of a polymeric material. Webs 18 and 38 can be composed of the same or different polymeric materials. As shown in FIG. 2, web 18 overlays web 38 so that the unfused toner patterns are on the top surface of the composite structure. Alternatively, web 38 can be placed on top of web 18, in which case the toner patterns will lie between the webs. Bonding and cutting of the polymeric sheets can be successfully accomplished with either configuration. Printing can also be performed for both configurations, but is generally easier to perform when web 18 overlays web 38.

Infrared energy source 40 can comprise one or more infrared lamps. Preferably, the energy emitted by the lamps is focused into the plane of webs 18 and 38. As discussed above, this focused infrared energy is preferentially absorbed by the unfused toner resulting in local heating of the polymeric materials. This local heating, in turn, results in the desired cutting, bonding, or printing of the polymeric sheets. Specifically, in the case of bonding or cutting, the local heating results in localized melting of the thermoplastic material so that the sheets are bonded or cut as desired.

After passing under infrared energy source 40, webs 18 and 38 are passed through pressure rollers 42 and 44 which aid in the bonding process, as well as the cutting and printing processes. Thereafter, the combined webs are cooled or allowed to cool and, if cutting has been performed, the finished articles are separated from the remainder of the web.

It may be noted that the location of other sheets or webs which may be present is not known to be critical. For example, if a nonwoven web is to be bonded to another sheet, such other sheet can be located adjacent to the surface of the nonwoven web which is opposite the surface on which the pattern is placed. Alternatively, such other sheet can be located adjacent to the surface on which the pattern is placed. In the latter case, however, the other sheet must permit an amount of infrared energy to pass through it which is sufficient to accomplish the desired bonding and/or cutting; in other words, the other sheet must be substantially transparent to infrared energy. Other variations, of course, will be readily apparent to those having ordinary skill in the art.

Further processing of the articles can be performed as desired. For example, if the appearance of fused toner at the bond or cutting lines is objectionable for aesthetic reasons, the toner can be covered with an appropriately colored material or can be removed with solvents. Similarly, if printing has not been performed, the articles can be printed or otherwise decorated as appropriate.

Without intending to limit it in any manner, the present invention will be more fully described by the following examples.

EXAMPLE 1

This example illustrates the bonding of various polymeric films and fabrics using the techniques of the present invention.

The experiments were performed using (1) an infrared energy source consisting of an IR lamp, a focusing reflector, and a variable voltage control unit for controlling the amount of IR energy generated by the lamp, (2) a rotating shutter for controlling the exposure of the sample to the IR energy, and (3) a spring-loaded pressure bar which applied a pressure of 6.7 psi (0.47kg/cm$^2$) to the samples immediately after the end of the exposure.

Three polymeric materials were tested, namely, a polyethylene film (hereinafter "film A"), a polypropylene film (hereinafter "film B"), and a 75% polypropylene/25% polyester carded/bonded nonwoven fabric (hereinafter "fabric"). Strips of material 0.5"×1.5" (1.3 cm×3.8 cm) were used in the tests. Two strips of the same or different materials were laid on top of one another, pulled taut and bonded. The bond zone covered the full width of the strips and had a zone width of approximately 0.10 inch (2.5 mm). Bond strengths were measured by loading the bonded samples in tension using a modified Chattilon stress gauge.

The combinations tested were film A/film A, film B/fabric, and fabric/fabric. An all-purpose marker and loose toner were used as infrared-absorbing materials. The loose toner was applied to the upper surface of the top test strip for the film A/film A and film B/fabric tests and between the test strips for the fabric/fabric tests. The black marker was tested in both locations. The infrared-absorbing materials covered the entire bond area. Bonds were also formed without the use of an infrared-absorbing material.

The results for the toner tests and the tests performed without the use of an infrared-absorbing material are shown in Table 1. As shown therein, good bonds, i.e., bonds stronger than 0.5 lb. (0.23 kg), were produced in all cases. Use of the infrared-absorbing material resulted in significant reductions in exposure times and required energy levels (lamp voltages) without sacrificing bond strength. The exposure time reduction is of importance in achieving high line speeds for the overall process. Moreover, although bonding can be achieved without the use of toner, to create bonds in a particular pattern would require focusing the IR energy along the pattern, which is impractical in practice.

TABLE 1

| Materials | Toner | Strength lbs (kg) | Lamp Voltage (volts) | Exposure Time (seconds) |
|---|---|---|---|---|
| Film A/Film A | Yes | 1.0 (0.45) | 100 | 0.300 |

TABLE I-continued

| Materials | Toner | Strength lbs (kg) | Lamp Voltage (volts) | Exposure Time (seconds) |
|---|---|---|---|---|
| Film B/Fabric | Yes | 0.9 (0.41) | 75 | 0.050 |
| Fabric/Fabric | Yes | 1.7 (0.77) | 90 | 0.044 |
| Film A/Film A | No | 1.1 (0.50) | 150 | 0.090 |
| Film B/Fabric | No | 1.4 (0.64) | 160 | 0.080 |
| Fabric/Fabric | No | 1.6 (0.73) | 160 | 0.070 |

The black marker tests also produced good bonds having strength greater than 0.5 lb. (0.23 kg). The bond strengths were in general less than those achieved with the toner. The black marker was found to have a tendency to plasticize the polymeric materials at the bond site irrespective of whether it was applied to the top surface or between the test samples.

As shown by these experiments, strong bonds between various polymeric materials can be achieved through the use of an infrared-absorbing xerographic toner at the bond site.

EXAMPLE 2

This example illustrates the use of the present invention to produce gloves having a thermoplastic palm and an elastomeric backing.

The xerographic copying equipment shown in FIG. 2 was used to produce the gloves. The equipment was operated at a speed of 32 copies per minute. Standard black toner (Royal Toner UA943920, Royal Business Machines, Inc., Windsor, Conn.) was used to produce bonding patterns having the shape shown in FIG. 1. The patterns had a line width of approximately 2 millimeters. Web 18 consisted of spunbonded polypropylene; web 38 consisted of 30% meltblown polyethylene and 70% KRATON G-1657 copolymer (Shell Chemical) to impart a stretch behavior to the glove.

The finished gloves were found to have a strong bond between the palm and backing along the full length of the bonding pattern and were considered equivalent to gloves produced by conventional techniques.

Having thus described the invention, numerous changes and modifications thereof will be readily apparent to those having ordinary skill in the art without departing from the spirit or scope of the invention.

What is claimed is:

1. A method for bonding together two sheets of polymeric material at predetermined locations, at least one of said sheets being a nonwoven web prepared predominantly from a thermoplastic polymeric material, which method comprises the steps of:
   (a) forming by a xerographic process a pattern of an infrared-absorbing xerographic toner on said nonwoven web, said pattern corresponding to the predetermined locations at which the sheets are to be bonded;
   (b) contacting the sheets with one another;
   (c) exposing the contacted sheets to infrared energy, said infrared energy causing the sheets to be heated to a higher temperature in the areas of the infrared-absorbing xerographic toner than in areas away from the infrared-absorbing xerographic toner;
   (d) applying pressure to the sheets; and
   (e) cooling the sheets or allowing the sheets to cool; the amount of infrared energy and the distribution of infrared-absorbing xerographic toner being chosen so that the sheets bond to one another in the areas of the infrared-absorbing xerographic toner.

2. The method of claim 1 including the additional step prior to exposing step (c) of forming by a xerographic process a second pattern of an infrared-absorbing xerographic toner on said nonwoven web, the amount of infrared energy and the distribution of infrared-absorbing xerographic toner in the second pattern being chosen so that the performance of steps (c), (d), and (e) causes cutting of the sheets in the areas of the second pattern of infrared-absorbing xerographic toner.

3. The method of claim 2, in which at least a portion of the second pattern is geometrically similar to and larger than the pattern.

4. The method of claim 1, in which the infrared-absorbing xerographic toner is white, translucent, or transparent.

5. The method of claim 2, in which the infrared-absorbing xerographic toner for each of the pattern and the second pattern is white, translucent, or transparent.

6. The method of claim 1, in which (a) at least one of the sheets is substantially transparent to infrared energy, (b) the infrared-absorbing material is exposed to infrared energy through the substantially transparent sheet.

7. A method for bonding together two sheets of polymeric material at predetermined locations, at least one of said sheets being a nonwoven web prepared predominantly from a thermoplastic polymeric material, which method comprises the steps of:

(a) contacting the sheets with one another;

(b) forming by a xerographic process a pattern of an infrared-absorbing xerographic toner on said nonwoven web, said pattern corresponding to the predetermined locations at which the sheets are to be bonded;

(c) exposing the contacted sheets to infrared energy, said infrared energy causing the sheets to be heated to a higher temperature in the areas of the infrared-absorbing xerographic toner than in areas away from the infrared-absorbing xerographic toner;

(d) applying pressure to the sheets; and (e) cooling the sheets or allowing the sheets to cool; the amount of infrared energy and the distribution of infrared-absorbing xerographic toner being chosen so that the sheets bond to one another in the areas of the infrared-absorbing xerographic toner.

8. The method of claim 7 including the additional step prior to exposing step (c) of forming by a xerographic process a second pattern of an infrared-absorbing xerographic toner on said nonwoven web, the amount of infrared energy and the distribution of infrared-absorbing xerographic toner in the second pattern being chosen so that the performance of steps (a), (b), and (c) causes cutting of the sheets in the areas of the second pattern of infrared-absorbing xerographic toner.

9. The method of claim 8, in which at least a portion of the second pattern is geometrically similar to and larger than the pattern.

10. The method of claim 7, in which the infrared-absorbing xerographic toner is white, translucent, or transparent.

11. The method of claim 8, in which the infrared-absorbing xerographic toner for each of the pattern and the second pattern is white, translucent, or transparent.

12. The method of claim 1, in which (a) at least one of the sheets is substantially transparent to infrared energy, (b) the infrared-absorbing material is between the sheets, and (c) the infrared-absorbing material is exposed to infrared energy through the substantially transparent sheet.

13. A method for cutting a sheet of polymeric material at predetermined locations, which sheet comprises a nonwoven web prepared predominantly from a thermoplastic polymeric material, which method comprises the steps of:

(a) forming by a xerographic process a pattern of an infrared-absorbing xerographic toner on said nonwoven web, said pattern corresponding to the predetermined locations at which the sheet is to be cut; and (b) exposing the sheet to infrared energy, said infrared energy causing the sheet to be heated to a higher temperature in the areas of the infrared-absorbing material than in areas away from the infrared-absorbing material;

the amount of infrared energy and the distribution of infrared-absorbing material being chosen so that the sheet is substantially weakened in the areas of the infrared-absorbing material through local melting of the thermoplastic polymeric material of which the nonwoven web is composed.

14. The method of claim 13, in which the infrared-absorbing xerographic toner is white, translucent, or transparent.

* * * * *

UNITED STATES PATENT AND TRADEMARK OFFICE
CERTIFICATE OF CORRECTION

PATENT NO. : 5,244,525

DATED : September 14, 1993

INVENTOR(S) : Neuwirth, et al.

It is certified that error appears in the above-indentified patent and that said Letters Patent is hereby corrected as shown below:

Column 5, line 4, "poly(n-valeraldehyde),..." should read --poly(n-valeraldehyde),...--;

Column 5, line 19, "poly(m-phenylene...)" should read --poly(m-phenylene...)--;

Column 5, line 20, "poly-p-xylylene, poly(chloro-p-..." should read --poly-p-xylylene, poly(chloro-p-...--;

Column 5, line 22, "poly(p-phenylene oxide),..." should read --poly(p-phenylene oxide),...--;

Column 5, line 31, "4-dimethyleneterephthalate)..." should read --4-dimethylene terephthalate)...--;

Column 5, line 34, "poly(p-phenylene sulfide)..." should read --poly(p-phenylene sulfide)...--;

UNITED STATES PATENT AND TRADEMARK OFFICE
CERTIFICATE OF CORRECTION

PATENT NO. : 5,244,525
DATED : September 14, 1993
INVENTOR(S) : Neuwirth, et al.

It is certified that error appears in the above-indentified patent and that said Letters Patent is hereby corrected as shown below:

Column 11, line 20, "...to infrared energy, (b) the infrared-absorbing material is exposed to infrared energy through the substantially transparent sheet." should read --...to infrared energy, (b) the infrared-absorbing material is between the sheets, and (c) the infrared-absorbing material is exposed to infrared energy through the substantially transparent sheet.--.

Signed and Sealed this

Fourteenth Day of March, 1995

Attest:

BRUCE LEHMAN

*Attesting Officer*

*Commissioner of Patents and Trademarks*